United States Patent
Ma et al.

(10) Patent No.: US 12,385,174 B2
(45) Date of Patent: Aug. 12, 2025

(54) TUBULAR DOUBLE-NEEDLE BED WARP KNITTING MACHINE

(71) Applicant: JIANGNAN UNIVERSITY, Wuxi (CN)

(72) Inventors: Pibo Ma, Wuxi (CN); Shuang Yu, Wuxi (CN); Gaoming Jiang, Wuxi (CN); Honglian Cong, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 0 days.

(21) Appl. No.: 18/450,118

(22) Filed: Aug. 15, 2023

(65) Prior Publication Data

US 2023/0383445 A1 Nov. 30, 2023

Related U.S. Application Data

(63) Continuation of application No. PCT/CN2021/119115, filed on Sep. 17, 2021.

(30) Foreign Application Priority Data

Feb. 24, 2021 (CN) .......................... 202110207088.4

(51) Int. Cl.
*D04B 21/20* (2006.01)
*D04B 25/02* (2006.01)

(52) U.S. Cl.
CPC ........... *D04B 21/202* (2013.01); *D04B 25/02* (2013.01)

(58) Field of Classification Search
CPC ........ D04B 25/02; D04B 25/04; D04B 27/02; D04B 27/16; D04B 27/24; D04B 27/10; D04B 27/06; D04B 21/20
See application file for complete search history.

(56) References Cited

U.S. PATENT DOCUMENTS

| 2,166,494 A * | 7/1939 | Hiller | D04B 25/02 66/81 |
| 2,664,006 A * | 12/1953 | Lund | D04B 25/02 66/81 |

(Continued)

FOREIGN PATENT DOCUMENTS

| CN | 1445405 A | 10/2003 |
| CN | 112921491 A | 6/2021 |

(Continued)

OTHER PUBLICATIONS

International Search Report and Written Opinion issued in International Patent Application No. PCT/CN2021/119115; mailed Dec. 22, 2021; 12 pgs.

(Continued)

*Primary Examiner* — Aiying Zhao
(74) *Attorney, Agent, or Firm* — HAUPTMAN HAM, LLP

(57) ABSTRACT

A tubular double-needle bed warp knitting machine includes a warp let-off mechanism, and a loop-forming mechanism. The loop-forming mechanism includes guide needles in a circular pattern, two circular needle beds arranged internally and externally, knitting needles in a circular pattern along the internal and external needle beds, and knitting components that move in coordination with the knitting needles. Some of the guide needles form loops on the internal and external circular needle beds to connect sections of the two fabric pieces to create a three-dimensional tubular fabric. The formed three-dimensional tubular fabric gradually exits the knitting area.

6 Claims, 3 Drawing Sheets

(56) References Cited

U.S. PATENT DOCUMENTS

| | | | | |
|---|---|---|---|---|
| 3,668,904 A * | 6/1972 | Murenbeeld | ........... | D04B 27/00 |
| | | | | 66/212 |
| 3,901,050 A * | 8/1975 | Schur | ..................... | D04B 15/66 |
| | | | | 66/81 |
| 4,099,389 A * | 7/1978 | Herbein | ................. | D04B 25/02 |
| | | | | 66/135 |
| 9,970,136 B2 * | 5/2018 | Inli | ......................... | D04B 9/56 |

FOREIGN PATENT DOCUMENTS

| | | | | | |
|---|---|---|---|---|---|
| DE | | 631874 C | * | 6/1936 | ............. D04B 25/02 |
| DE | | 684124 C | * | 11/1939 | ............. D04B 25/02 |
| SU | | 737529 A1 | * | 5/1980 | |

OTHER PUBLICATIONS

Search Report issued in Chinese Application No. 202110207088.4; mailed Oct. 18, 2021; 2 pgs.
First Office Acton issued in Chinese Application No. 202110207088.4; mailed Oct. 18, 2021; 8 pgs.

* cited by examiner

TUBULAR DOUBLE-NEEDLE BED WARP KNITTING MACHINE

RELATED APPLICATIONS

The present application is a Continuation of International Application Number PCT/CN2021/119115 filed Sep. 17, 2021, and claims priority to Chinese Application Number 202110207088.4 filed Feb. 24, 2021, the disclosures of which are hereby incorporated by reference herein in their entireties.

BACKGROUND OF THE INVENTION

1. Technical Field

The invention belongs to the technical field of textile processing and textile machinery, and particularly relates to a tubular double-needle bed warp knitting machine.

2. Description of Related Art

Traditional double-needle bed warp knitting machines consist of two parallel needle beds with the needle backs relative to each other. They are composed of a loop-forming mechanism, a warp let-off mechanism, a guide bar shogging system, a take-up mechanism, an integrated control system, and auxiliary devices. The double-needle bed warp knitting machine can knit separately on the front and back needle beds using one or multiple guide bars, and then connect two fabric pieces partially or fully through certain guide bars. Compared to weft knitting machines, double-needle bed warp knitting machines are characterized by high production efficiency, a wide range of product types, and diverse patterns. The main products of double-needle bed warp knitting machines include underwear products, plush products, warp knitted spacer fabrics, and warp knitted tubular fabrics.

The production process of tubular knitted fabrics is flexible, and it offers a variety of organizational structures and shapes. It not only reduces waste and loss of raw materials due to cutting but also avoids the impact of seams on structure and properties of fabrics, which significantly improves the production efficiency and reduces the costs. Due to its unique properties, tubular knitted fabrics greatly enrich the variety and application range of knitted products, finding extensive use in automotive, medical, firefighting, oil transportation, aerospace, and other fields.

BRIEF SUMMARY OF THE INVENTION

Technical Issues

The technical issues to be settled by the invention is that the tubular wrap knitted fabric produced by conventional double-needle bed warp knitting machines is knitted in a single plane, which limits its structure and restricts its application. The technology of combination tubular fabrics with double-needle warp knitting machines is not yet mature.

Technology Solutions

The object of the invention is to provide a tubular double-needle bed warp knitting machine, in order to overcome the limitations of traditional double-needle warp knitting machines, simplify the production process of three-dimensional fabrics, shorten the production cycle, reduce the loss and waste of raw materials, and leverage the advantages of tubular fabrics to improve the range of applications for warp knitted products, making them suitable for a broader market.

To achieve the above invention objects, the technical scheme adopted in the present invention is as follows:

One object of the present disclosure is to provide a tubular double-needle bed warp knitting machine, comprising a warp let-off mechanism, a loop-forming mechanism, and a and take-up mechanism. The loop-forming mechanism includes guide needles arranged in a circular pattern, two circular needle beds arranged internally and externally, knitting needles arranged in a circular pattern along the internal and external needle beds, and knitting components that move in coordination with the knitting needles.

Furthermore, the knitting needles are latch needles, and the knitting components that move in coordination with the knitting needles include a knocking-over bar and a sinker, with the backs of the latch needles on the two circular needle bed are opposite to each other. The guide needles are used to add yarns, and the latch needles hook the introduced yarns in and form the loops, with the knocking-over bar and the sinker coordinating with the movement of the latch needles.

Furthermore, some of the guide needles undergo periodic expansion, contraction, and curved shogging motion along the radial direction to form loops on the internal and external circular needle beds, while the remaining guide needles undergo synchronous expansion, contraction, and curved shogging motion along the radial direction to alternately form loops on the internal and external circular needle beds, connecting partial or all sections of the two fabric pieces to create a three-dimensional tubular fabric. The formed three-dimensional tubular fabric gradually exits the knitting area through the traction of the and take-up mechanism.

Furthermore, the guide needles are arranged in three concentric circles: inner, middle, and outer. The three circles of guide needles undergo synchronized periodic expansion, contraction, and curved shogging motion. The outer circle of guide needles is configured to cooperate with the outer circular needle bed to form loops with the external circular needle bed, the inner circle of guide needles is configured to cooperate with the inner circular needle bed to form loops with the internal circular needle bed, and the middle circle of guide needles alternately moves on the internal and external circular needle beds to connect partial or all sections of the two fabric pieces.

Furthermore, the warp let-off mechanism includes warp beams, guide reeds, and tension rods. The warp beams include flanges, and there are a pair of warp beams in each of the four directions, each pair of which includes a pair of guide reeds and a pair of tension rods.

A second object of the present disclosure is to provide a preparation method of the three-dimensional tubular fabric using the above-mentioned tubular double-needle warp knitting machine, comprising the following steps:

S1: When the knitting needles rise to the highest position, the three circles of guide needles expand. When the knitting needles descend, the three circles of guide needles contract to their original position. During this expansion-contraction cycle, the outer circle of guide needles and the middle circle of guide needles participate in the yarn laying process, while the inner circle guide needles does not participate in the yarn laying process.

S2: The knitting needles rise to the highest position again, and the three circles of guide needles contract. When the knitting needles descend again, the three circles of guide needles expand to their original position. During this contraction-expansion cycle, the inner circle of guide needles and the middle circle of guide needles participate in the yarn laying process, while the outer circle of guide needles does not participate in the yarn laying process.

S3: Repeat S1 to S2.

Furthermore, before S1, the interval distance between the external circular needle bed and the internal circular needle bed is adjusted according to the thickness requirements of the fabric.

Furthermore, the yarns used are made from natural fibers or chemical fibers.

Furthermore, the natural fibers can be cotton or blending fibers.

Furthermore, the chemical fibers can be polyester, polypropylene, nylon, acrylic, or viscose.

The invention has the following specific advantages:

Compared to ordinary warp knitting machines and circular knitting machines, the tubular double-needle warp knitting machine of the present invention has significant advantages. It has high production efficiency and breaks through the limitations of traditional double-needle warp knitting machines. It simplifies the production process of tubular double-needle warp knitted fabrics and leverages the advantages of tubular fabrics to optimize product performance. This makes warp knitted products suitable for a broader market and applicable in various fields, such as automotive, medical, firefighting, construction, transportation, military defense, aerospace, and more.

Among the figures, 1-1 represents the external circular needle bed, 1-2 represents the internal circular needle bed, 1-3 represents the outer needle, 1-4 represents the inner needle, 1-5 represents the guide needle, 1-6 represents the yarns, 1-7 represents the knocking-over bar, 1-8 represents the sinker, 2-1 represents the warp beam, 2-2 represents the flange, 2-3 represents the guide reed, and 2-4 represents the tension rod.

DETAILED DESCRIPTION OF THE INVENTION

In order to make the above purposes, features and advantages of the invention clearer and easily understood, the specific embodiments of the invention will be further described below in conjunction with specific drawings.

Embodiment 1

Figure 1:
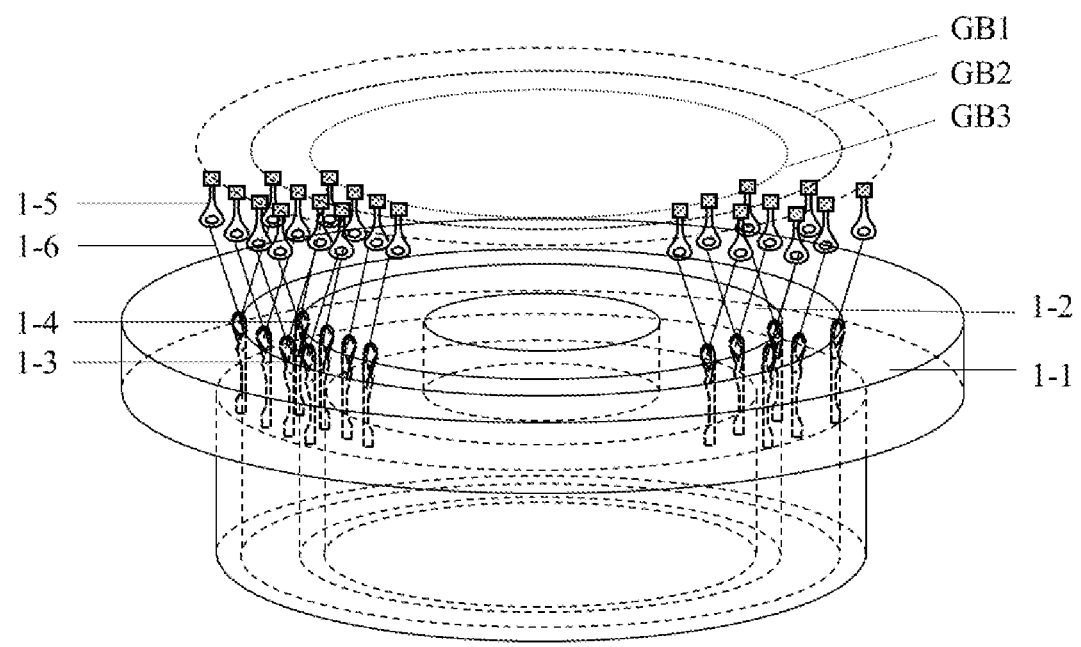
FIG. 1 is a schematic diagram of the loop-forming mechanism of the tubular double-needle warp knitting machine.
Figure 2:
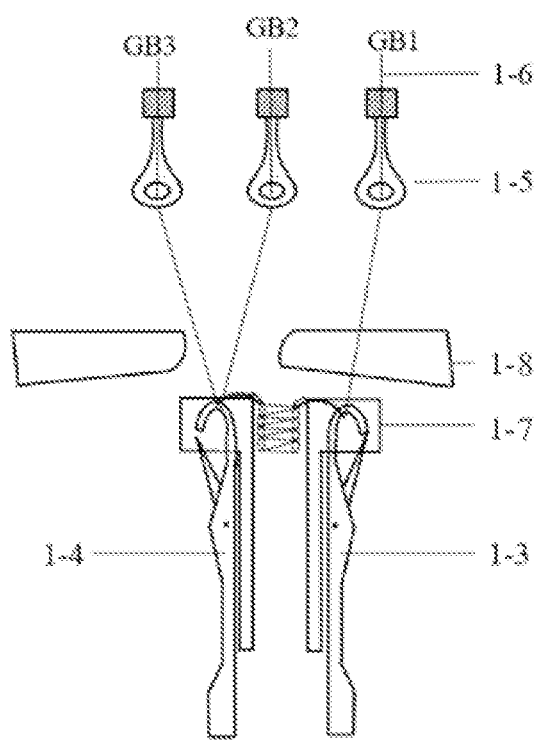
FIG. 2 is a detailed view of the loop-forming mechanism of the tubular double-needle warp knitting machine.
Figure 3:
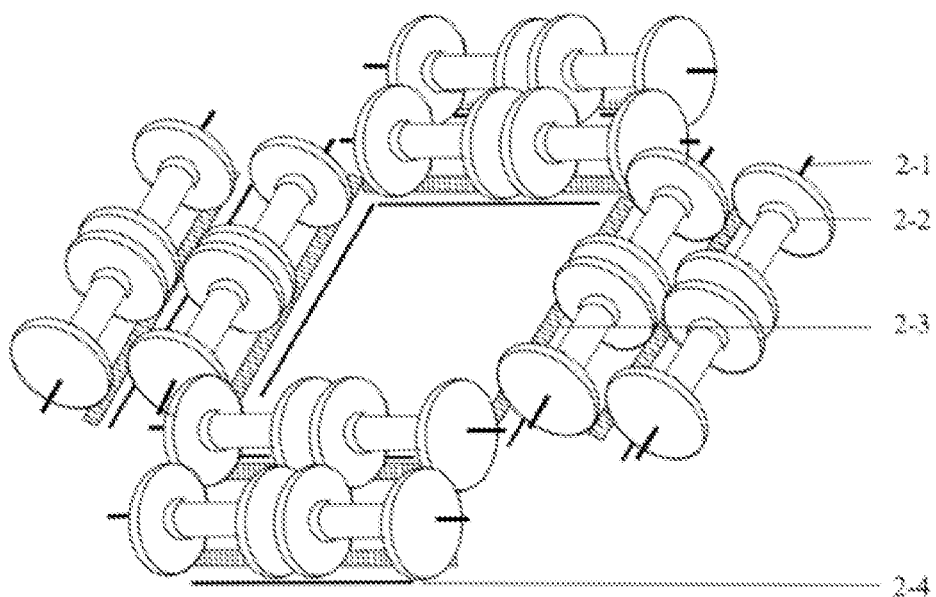
FIG. 3 is a schematic diagram of the warp let-off mechanism of the tubular double-needle warp knitting machine.

As shown in FIG. 1-FIG. 3, a tubular double-needle warp knitting machine includes a warp let-off mechanism, a loop-forming mechanism, and a and take-up mechanism. The loop-forming mechanism includes guide needles 1-5 arranged in a circular pattern, an external circular needle bed 1-1 and an internal circular needle bed 1-2 arranged externally and internally, outer needles 1-3, inner needles 1-4 arranged along the external and internal circular needle beds, and knocking-over bars 1-7 and sinkers 1-8 corresponding to the knitting needles. The back of the two latch needles on the two circular needle beds is opposite to each other. The thickness of the fabric is adjustable and can be regulated by adjusting the interval distance between the internal and external needle beds.

The guide needles 1-5 are used to add yarns 1-6, and the latch needles (1-3, 1-4) hook the introduced yarns in and form the loops, with the knocking-over bar (1-7) and the sinker (1-8) coordinating with the movement of the latch needles (1-2, 1-3). The guide needles (1-5) are arranged in three concentric circles: inner, middle, and outer (GB1, GB2, GB3). The three circles of guide needles undergo synchronized periodic expansion, contraction, and curved shogging motion.

The warp let-off mechanism includes warp beams 2-1, flanges 2-2, guide reeds 2-3, and tension rods 2-4. Each of the four directions has a pair of warp beams 2-1, and each pair of warp beams 2-1 includes a pair of guide reeds 2-3 and a pair of tension rods 2-4 below them to ensure even tension of yarn 1-6. Each warp beam is individually controlled, making the operation convenient, and the amount of warp feeding can be precisely controlled. Yarns 1-6 of specified lengths are fed from the flanges 2-2 on the four warp beams 2-1 in different directions and pass through guide reeds 2-3 and tension rods 2-4 before being delivered to the loop-forming mechanism. The number and positions of the flanges 2-2 can be adjusted according to specific needs.

The outer circle of guide needle GB1 forms loops on the external circular needle bed 1-1, and the inner circle of guide needle GB3 forms loops on the internal circular needle bed 1-2. The yarns 1-6 output from the tension rod 2-4 are separately looped on the internal and external circular needle beds (1-1, 1-2) to knit pieces. The middle circle of guide needle GB2 alternately moves on the internal and external circular needle beds to connect the partial or all sections of the two fabric pieces. The formed three-dimensional tubular fabric is gradually removed from the knitting area through the traction of the and take-up mechanism, while new yarns are continuously fed in.

The tubular double-needle warp knitting machine of the present invention is suitable for knitting cotton yarns, blended yarns, and other natural fibers, as well as polyester, polypropylene, nylon, acrylic, viscose, and other chemical fibers.

Figure 4:
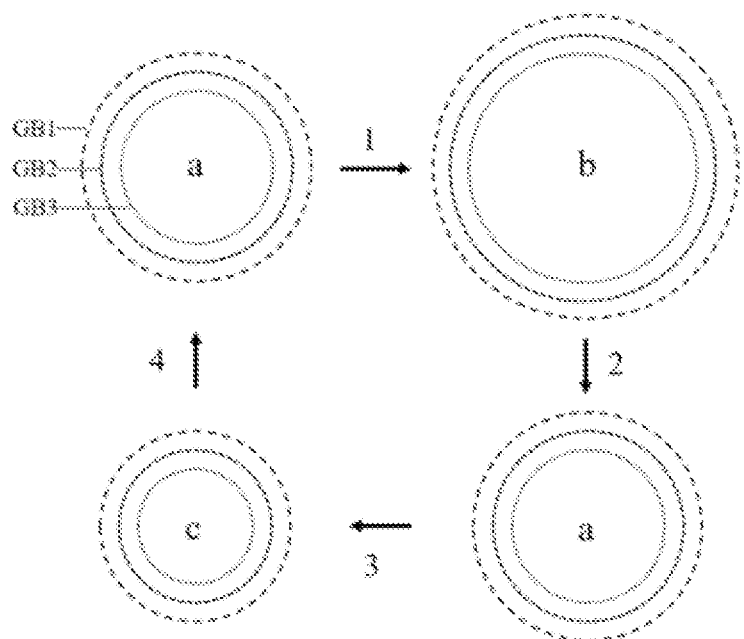
FIG. 4 demonstrates the shogging motion of the guide bar in the tubular double-needle warp knitting machine.

As shown in FIG. 4, during the knitting process, the movement of guide needles 1-5 (GB1, GB2, GB3) includes circular contraction, expansion, and curved shogging motion, specifically:

S1: When the knitting needles rise to the highest position, the guide needles start to swing outwards from position a to the outer circular knitting needle bed machine 1-1 (Step 1);

S2: When the guide needles swing into the position, the knitting needles start to descend, and the guide needles undergo a contraction motion (Step 2), until the guide needles return to position a. During this process, only GB1 and GB2 participate in loop formation, and GB3 performs only radial contraction and expansion swinging without loop formation;

S3: The knitting needles rise again to the highest position, the guide needles swing into the inner circular needle bed 1-2 for contraction motion (Step 3);

S4: When the guide needles swing into the position, the knitting needles start to descend, and the guide needles undergo an expansion motion, until the guide needles return to position a. During this process, only GB2 and GB3 participate in loop formation, and GB3 performs only radial expansion and contraction swinging without loop formation;

S5: Repeat S1 to S4.

Many specific details are expounded in the above description to provide a comprehensive understanding of the invention, but the invention can also be implemented in other ways different from those described here. Any modifications, equivalent replacements, and improvements that can be made by those skilled in the art within the spirit and principles of the present invention should be included in the scope of protection of the present invention.

What is claimed is:

1. A tubular double-needle bed warp knitting machine, comprising a warp let-off mechanism, and a loop-forming mechanism, wherein the warp let-off mechanism includes warp beams, guide reeds, and tension rods, and the warp beams include flanges, and there are a pair of warp beams in each of the four directions of the warp let-off mechanism, each pair of the warp beams includes a pair of guide reeds and a pair of tension rods;

wherein the loop-forming mechanism includes guide needles arranged in a circular pattern, two circular needle beds being arranged as an inner circular needle bed and an outer circular needle bed, knitting needles arranged in a circular pattern along the inner and outer needle beds, and knitting components configured to move in coordination with the knitting needles, the knitting components include knocking-over bars and sinkers;

wherein the knitting needles are latch needles, and the knitting components are configured to move in coordination with the knitting needles, backs of the latch needles on the two circular needle beds are opposite to each other, the guide needles are used to add yarns, and the latch needles configured to hook introduced yarns and to form loops, with the knocking-over bars and the sinkers coordinating with movements of the latch needles;

wherein the guide needles are arranged in three concentric circles, configured to form an inner circle of guide needles, a middle circle of guide needles, and an outer circle of guide needles, the three circles of guide needles are configured to undergo synchronized periodic expansion, contraction, and curved shogging motion;

wherein the outer circle of guide needles is configured to cooperate with the outer circular needle bed to form loops, and the inner circle of guide needles is configured to cooperate with the inner circular needle bed to form loops, the outer circular needle bed is configured to form a first fabric piece, and the inner circular needle bed is configured to form a second fabric piece, and the middle circle of guide needles are configured to alternately move on the inner and outer circular needle beds to connect partial or all sections of the first and second fabric pieces to create a three-dimensional tubular fabric.

2. A tubular double-needle bed warp knitting machine according to claim 1, wherein the three-dimensional tubular fabric is configured to gradually exit the knitting area.

3. A preparation method of a three-dimensional tubular fabric, using the tubular double-needle warp knitting machine according to claim 1 for knitting, the guide needles being used to add yarns, and the latch needles configured to hook the introduced yarns in and form the loops, with the knocking-over bars and the sinkers configured to coordinate with movements of the latch needles, the method comprising the following steps:

S1: raising the knitting needles to the highest position, expanding the three circles of guide needles, lowering the knitting needles, and contracting the three circles of guide needles to their original position, during this expansion-contraction cycle, the outer circle of guide needles and the middle circle of guide needles participate in a yarn feeding process, while the inner circle of guide needles does not participate in the yarn feeding process;

S2: raising the knitting needles to the highest position again, and contracting the three circles of guide needles, lowering the knitting needles again, expanding the three circles of guide needles to their original position, during this contraction-expansion cycle, the inner circle of guide needles and the middle circle of guide needles participate in yarn laying process, while the outer circle of guide needles does not participate in the yarn laying process;

S3: repeating S1 to S2.

4. A preparation method of the three-dimensional tubular fabric according to claim 3, wherein before S1, the method includes adjusting an interval distance between the outer circular needle bed and the inner circular needle bed based on a thickness requirement of the fabric.

5. A preparation method of the three-dimensional tubular fabric according to claim 3, wherein the yarns used are made from natural fibers or chemical fibers.

6. A preparation method of the three-dimensional tubular fabric according to claim 5, wherein the chemical fibers can be polyester fibers, polypropylene fibers, nylon fibers, acrylic fibers, or viscose fibers.

* * * * *